Jan. 6, 1959   W. J. BOWAN   2,867,034
APPARATUS FOR CHANGING STOPS
Filed Nov. 18, 1954   2 Sheets-Sheet 1

INVENTOR
WALTER J. BOWAN

BY Cushman, Darby & Cushman
ATTORNEYS

Jan. 6, 1959   W. J. BOWAN   2,867,034
APPARATUS FOR CHANGING STOPS
Filed Nov. 18, 1954   2 Sheets-Sheet 2
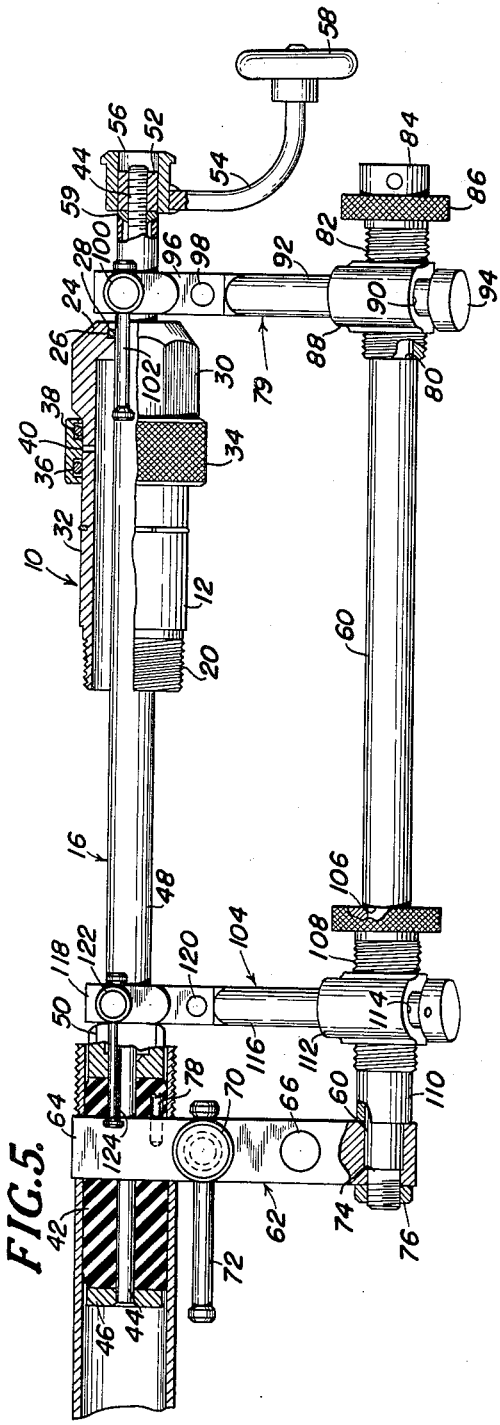
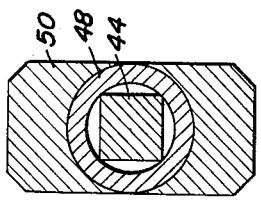
INVENTOR
WALTER J. BOWAN
BY Cushman, Darby & Cushman
ATTORNEYS United States Patent Office 2,867,034
Patented Jan. 6, 1959

2,867,034

APPARATUS FOR CHANGING STOPS

Walter J. Bowan, Decatur, Ill., assignor to Mueller Co., Decatur, Ill., a corporation of Illinois Application November 18, 1954, Serial No. 469,650

4 Claims. (Cl. 29—213)

This invention relates to stop valve changing and more particularly to an improved apparatus and procedure for safely changing a stop valve on the downstream end of a pressurized fluid-containing conduit.

Stop valve changing devices are well known and usually comprise a hollow member engageable in the downstream side of the stop valve to be changed and an expansible closure means disposable within said member and insertable through the stop valve, when the latter is opened, into the end of the conduit therebeyond where expansion is effected to close off the flow of fluid. Such devices are generally utilized to replace or change a stop valve in a pressurized fluid-containing conduit where it is impossible or otherwise disadvantageous to shut off the flow of fluid to the stop valve. Thus, the devices are generally used in main conduit lines where the internal pressure of the fluid is considerably high. During the operation of these devices, the stop valve member is removed from the conduit end leaving the expansible closure means frictionally engaged within the conduit end as the sole means for closing off the flow of pressurized fluid. It sometimes happens that the internal pressure within the conduit is sufficient to "blow out" the expansible closure means, thus giving rise to many grave dangers. First, the expansible closure means itself blowing out of the conduit end may cause injury to the operator as well as other persons and equipment in the vicinity. And second, the pressurized fluid contained within the conduit is then free to flow therefrom which may result in disastrous circumstances. For example, where the conduit contains an inflammable gas, there is an immediate danger of an explosion, while if the conduit should contain a liquid such as water or the like, there is the attendant injury due to flooding and the like. This latter consideration is extremely significant since stop valve changing devices of the type described are generally utilized only where it is extremely difficult if not impossible to close off the flow of fluid to the stop valve being changed. It will be appreciated that it is a difficult matter indeed, to stop the flow of a pressurized fluid issuing out of a bare conduit end, and in most cases considerable fluid will be lost before the flow can be closed off.

Accordingly, it is an object of the present invention to provide an improved apparatus and procedure for safely changing stop valves of the type mentioned which will substantially overcome the disadvantages and dangers mentioned above.

Another object of the present invention is to provide an improved procedure for safely changing stop valves on the end of a pressurized fluid-containing conduit wherein the expansible closure means is at all times during the changing of the stop valve exteriorly held against movement outwardly of the conduit end.

Another object of the present invention is the provision of a novel safety clamp means or exterior securing means for a stop changing device of the type described, which is operable to secure the expansible closure means of the device against movement outwardly of the conduit end at all times during the changing of the stop valve.

Another problem experienced in the operation of the known stop changing devices concerns the proper engagement of the expansible closure means within the conduit end. Since the expansible closure means is hidden from view during the operation of the device, it frequently occurs that the expansible closure means has not been expanded into complete pressure-tight engagement within the conduit end. Consequently, when the stop valve is initially removed, there occurs a fluid leakage around the expansible closure means. Moreover, where the expansible closure means has not been properly expanded within the conduit end, there is an increasing danger of blow out. To prevent such an occurrence, it is often necessary to reattach the stop valve to the conduit end and tighten the expansion of the closure member before proceeding further with the operation of the device.

Accordingly, a further object of the present invention is the provision of an improved stop changing device having means for testing the pressure-tight condition of the engagement of the expansible closure member within the conduit end while the stop valve is attached to the conduit end.

A still further object of the present invention is the provision of a stop valve changing device having novel test valve means for initially determining whether or not the expansible closure means has been expanded into proper pressure-tight engagement within the conduit end.

These and other objects of the present invention will become more apparent during the course of the following detailed description and appended claims.

The invention may best be understood with reference to the accompanying drawings wherein an illustrative embodiment is shown.

In the drawings:

Figure 5 is a top plan view partially broken away showing the stop valve changing device and external securing means of the present invention in the condition illustrated in Figure 3, the stop valve being removed to more clearly illustrate the parts;

Figure 6 is an end view of the apparatus shown in Figure 5; and

Figure 7 is a cross sectional view taken along the line 7—7 of Figure 1.

Figure 1:
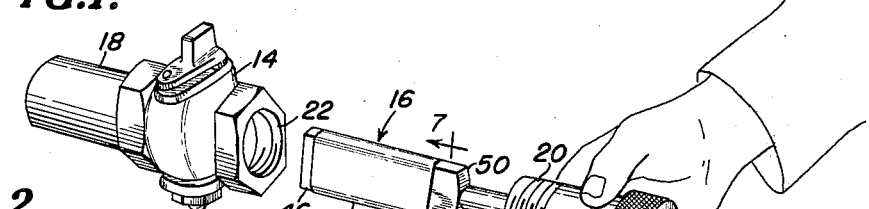
Figure 1 is a fragmentary perspective view showing the manner in which the stop valve changing device of the present invention is initially inserted into engagement with the downstream side of a stop valve to be changed.

Referring now more particularly to the drawings, there is shown in Figures 1 and 5 a stop valve changing device 10 which comprises, in general, a hollow member 12 constituting a pressure chamber adapted to be attached in pressure-tight engagement with the downstream side of a stop valve 14 to be changed, and expansible closure means 16 arranged to be disposed within the hollow member and to be inserted through the stop valve, when opened, into the downstream end of a conduit 18 to which the stop valve is attached.

The hollow member 12 is preferably provided at its inner end with suitable means, such as external threads 20, which are adapted to engage within the usual internal threads 22 of the stop valve. The outer end of the hollow member terminates in a reduced portion 24 having an annular recess 26 therein for receiving an O-ring sealing member 28 for a purpose hereinafter to be more fully explained. The outer surface of the hollow member is preferably formed adjacent one end thereof in hexagonal cross sectional shape, as indicated at 30, so as to provide suitable surfaces for engagement by a suitable securing tool, such as a wrench or the like. The remaining portion of the outer surface is preferably cylindrical, as indicated at 32, to receive a slidable collar member 34 having a pair of spaced annular grooves 36 therein for receiving a pair of O-ring sealing members 38 which form a pressure-tight engagement with the surface 32. Extending radially outwardly of the hollow member 12 is an outlet port 40 which cooperates with the sliding member 34 to form the test valve means of the present invention.

The expansible closure means 16 includes a resilient closure member 42 of substantial rectangular shape in cross section which may be formed of any suitable resiliently deformable material, such as rubber or the like. An elongated, longitudinally disposed rod 44 extends through a suitable aperture within the resilient member 42 and has secured to its inner end, by any suitable means, an enlarged washer element 46. Slidably enclosing the rod 44 is an elongated tubular member 48. The inner end of the tubular member 48 has an enlarged washer-like element 50 secured thereon and with the outer end of the resilient member 42. The outer end portion of the tubular member 48 is preferably reduced somewhat to provide a shoulder 51 (Figure 4) for reasons more fully explained hereinafter, while the inner end portion has a diameter sufficient to cause presture-tight engagement with the O-ring sealing member 28 of the member 12.

Threadedly engaged on the outer end of the rod 44, is a nut member 52 having its outer surface formed to non-rotatably receive a crank member 54 having a socket 56 registering with the nut member on one end thereof and a rotatable handle 58 on the outer end thereof. A bearing washer 59 (Figure 5) preferably is interposed between the nut 52 and the end of the tubular member 48 so that by turning the crank 54, rod member 44 will be moved longitudinally with respect to the tubular member 48 so as to expand or release the resilient member 42 between the enlarged elements 46 and 50.

The external securing means or safety clamp means of the present invention comprises an elongated rod member 60 carrying on its inner end suitable means 62 for securing the rod member to the conduit 18 in spaced parallel relation thereto with the outer end portion thereof extending outwardly of the end of the conduit. The securing means 62 preferably comprises a vise-like clamp having a pair of opposed jaws 64 mounted for relative sliding movement toward and away from each other by means of a guide pin 66 rigidly secured to one of the jaws and extending through a registering aperture in the other jaw. The jaws are moved toward and away from each other by a bolt member 68 threadedly engaged within one of the jaws and rotatably held in the other jaw. The bolt member 68 may include an enlarged head portion 70 having its lower end in abutting engagement with one of the jaws and its upper end provided with a suitable aperture through which a slidable turning lever 72 may extend. It will be seen that by turning the element 72, the member 68 by virtue of its abutting engagement and threaded engagement with the jaws will cause the same to move toward or away from each other depending on the direction of turning.

The secured means 62 may be rigidly mounted on the end of rod member 60 by any suitable means and, as shown in Figure 5, this means preferably comprises a shouldered aperture 74 formed in the outer end of one of the jaws 64. The end of the rod member is preferably reduced so as to form a cooperating shoulder and the reduced end is preferably threaded to receive a suitable nut 76. In order to insure that the securing means 62 will be positioned properly on the conduit with respect to the stop valve, a gauge pin 78 may extend outwardly from one of the jaws so as to engage the inner surface of the stop valve to be changed.

Extending from the outer end of the rod member is an outer clamping or securing means 79, which is adapted to engage and hold the outer end of the tubular member 48 against movement outwardly of the conduit end. To this end, the outer end portion of the rod member 60 is preferably reduced in diameter to form an outwardly facing shoulder 80 to receive in abutting relation the inner end of a tubular adjusting member 82 rotatably mounted thereon. A suitable collar 84 may be secured to the end of the rod member 60 to restrain the tubular member 82 against longitudinal movement. The adjusting member 82 includes an enlarged, knurled, annular knob 86 by which the member 82 may be rotated about rod member 60. The outer surface of the adjusting member 82 is threaded to receive a connecting element 88 having a transversely extending bore 90 formed therein in offset relation to the axis of the rod 60. Rotatably and slidably mounted within the bore 90 is a rod 92 having its outer end enlarged as at 94 and its inner end rigidly attached to one of the jaws 96 of a vise-like clamp similar to the vise-like clamp described above. As before, the jaws 96 are mounted for movement toward and away from each other by a guide pin 98 rigidly secured to one of the jaws and slidably received within a suitable aperture formed in the other jaw. A bolt member 100 abutting one of the jaws and threadedly engaged in the other jaw carries a sliding lever 102 for moving the jaws toward and away from each other.

Extending from an intermediate portion of the rod member 60 is an intermediate clamping or securing means 104, similar to means 79, but which is adapted to engage and secure the inner end of the tubular member 48 against movement outwardly of the conduit end. To this end, the inner end portion of the rod member 60 is reduced to form an inwardly facing shoulder 106 against which the outer end of a rotatable adjusting member 108 is engaged. A spacer member 110, is disposed between the inner end of the adjusting member 108 and the outer surface of the jaw 64 so as to restrain the adjusting member against longitudinal movement. Threadedly mounted on the adjusting member 108 is a connecting member 112 having a transverse aperture 114 for rotatably and slidably receiving a bar member 116 upon which is mounted one of a pair of jaws 118. The jaws 118, which form part of a vise-like clamp, are movable toward and away from each other by means of a guide pin 120 rigidly attached to one of the jaws and slidable through a suitable aperture in the other. The jaws are moved toward and away from each other by means of a threaded bolt member 122 and a slidable lever 124, as described above.

The present invention contemplates a novel procedure for safely changing stop valves on the downstream end of a pressurized fluid containing conduit by means of a stop valve changing device which is exteriorly held at all times during the changing of the stop valve against movement outwardly of the end of the conduit.

Figure 2:
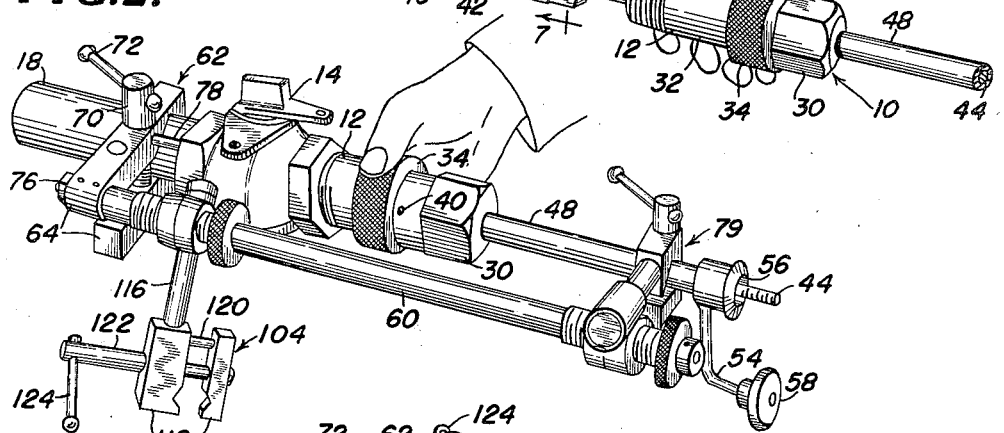
Figure 2 is a view similar to Figure 1 showing the exterior securing means of the present invention in its initial positon preparatory to the removal of the stop valve from the conduit end, the test valve means of the stop valve changing device being shown in its open position.

With the embodiment of the exterior securing means or safety clamp means described above, this procedure is carried out as follows. Referring now to Figure 1, the downstream side of the stop valve 14 is first exposed, with the valve in a closed position, as by removing the conduit or other member as the case may be that is connected therewith. The stop valve changing device 10 of the present invention is then inserted within the exposed downstream side of the stop valve in the manner illustrated in Figure 1. It will be noted that the expansible closure member 42 fits within the hollow member 12 and the exposed side of the stop valve so as to permit the hollow member 12 to be engaged within the stop valve threads 22. Preferably this connection is pressure-tight so that when the stop valve is moved to an open position, the hollow member 12 will close off the flow of pressurized fluid therefrom. It is also to be noted that the test valve means is maintained closed so that no escape of the pressurized fluid can occur. The engagement of the hollow member within the stop valve is illustrated in Figure 2.

After the hollow member has been engaged within the downstream side of the stop valve in the pressure-tight engagement, the elongated members 44 and 48 are moved inwardly so as to insert the closure member 42 through the open valve into the end of the conduit.

Preferably, the exterior securing means of the present invention is attached in place at this time, however, it will be understood that the conduit engaging securing means 62 may be clamped to the conduit anytime prior to the preceding steps. It will also be noted that the precise position of the securing means 62 with respect to the upstream side of the stop valve is readily determined by means of the gauge pin 78 so that the bar member 60 is held in parallel, spaced relation with respect to the tubular member 48. When the tubular member 48 has been moved forwardly, along with the related structure of the expansible closure means, so as to dispose the closure member 42 within the conduit end, the outer clamping means 79 may be moved into engagement with the outer end of the tubular member 48. In this regard, it is to be noted that the clamping means 79 may be moved into varying positions of longitudinal adjustment by turning the knurled knob 86 in the desired direction so that the jaws 96 will abut the shoulder 51. Further, the jaws 96 may be readily moved into embracing relationship to the tubular member by virtue of the pivotal movement of the connection member 88 about the axis of the rod member 60 and the transverse sliding and rotary movement of the bar 92 within the connecting member 88. When the jaws are thus positioned to embrace the tubular member 48 in abutting relation to the shoulder 51, sliding lever 102 is turned, which in turn will rotate the bolt member 100 to affect movement of the jaws relatively toward each other. In this manner, the outer end portion of the expansible closure means 10 is securely held, by the safety clamp means, against movement outwardly of the conduit end.

With the expansible closure means 10 thus held in proper relation with respect to the conduit end, the crank 54 is then turned by means of the handle 58 to expand and conform the closure member 42 into pressure-tight engagement within the conduit end. In order to insure that the closure member 42 has been expanded into pressure-tight engagement within the conduit end, the slidable member 34 is moved inwardly to expose the port 40 as shown in Figure 2. If there is a pressure leakage around the member 42, fluid will pass through the stop valve and into the interior of the hollow member 12. By opening the port 40, it is therefore possible to determine whether or not the engagement of the closure member 42 within the conduit end is sufficiently pressure-tight so as to exclude any flow of fluid through the port 40. If leakage occurs through the port 40, the handle 58 of the crank 54 may be further manipulated until a pressure-tight engagement is affected as determined by the cessation of flow of fluid outwardly of the port 40.

Figure 3:
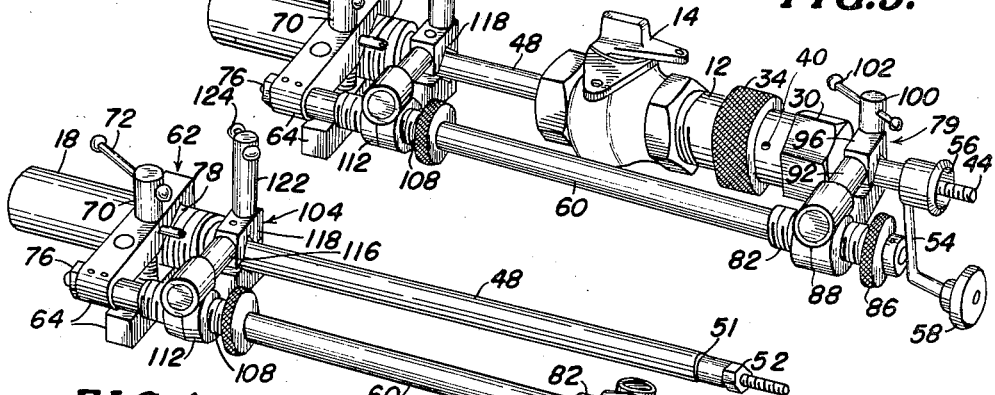
Figure 3 is a view similar to Figure 1 showing the stop valve removed from the conduit and with the external securing means secured to the stop valve changing device.

With the expansible closure member in pressure-tight engagement within the conduit end, the stop valve 14 is then unscrewed from the conduit end together with the tubular member 12. It will be noted that the rod member 60 is spaced from the stop valve a sufficient distance so as not to interfere with the rotation of the stop valve as the latter is unscrewed from the conduit end. After the stop valve has been disengaged from the conduit end, the latter, together with the hollow member 12 is slid outwardly along the tubular member 48 until the outer end of the tubular member is disposed adjacent the clamping means 79, as shown in Figure 3.

Figure 4:
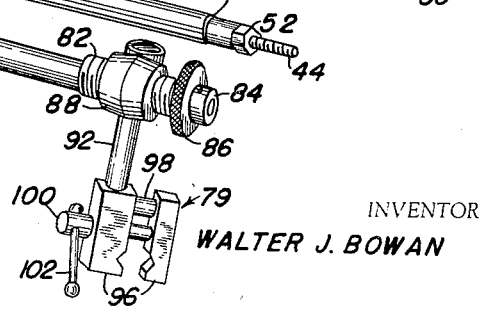
Figure 4 is a view similar to Figure 3 showing the conduit and the stop valve changing device and external securing means of the present invention after removal of the stop valve therefrom preparatory to the insertion of a replacement stop valve thereon.

The clamping means 104 is then positioned so that the jaws 118 embrace the inner end of the tubular member 48 in abutting relation to the washer 50 and then tighten so as to secure the expansible closure means against movement outwardly of the conduit end in the manner described in connection with the clamping means 79. After this securement has been effected, the outer clamping means 79 is then released from its engagement with the tubular member 48 so as to permit the stop member, with the attached tubular member 12, to be removed outwardly therefrom as shown in Figure 4, after the crank 54 has been removed from its socket engagement with the nut 52.

The tubular member 12 attached to the stop valve is then removed from the latter and threadedly engaged with another stop valve which is to replace the one removed. In this regard, it is to be understood that the terms "changing" and "replacing" as herein used comprehend within their meaning the utilization of the same stop valve either in a repaired condition or in the condition in which it was initially removed.

The "new" stop valve, with the hollow member 12 attached, is first opened and then inserted over the outer end of the tubular member and moved inwardly until the inner end of the stop valve is disposed adjacent the intermediate clamping means 104. The outer clamping means 79 is then secured to the tubular member at the outer portion thereof in the manner previously described thus permitting the release of the intermediate clamping means 104. The stop valve may then be threaded on the end of the conduit in pressure-tight engagement therewith.

With the "new" stop valve positioned on the end of the conduit, the expansible closure means is then withdrawn. To accomplish this, the crank 54 is placed in engagement with the nut member 52 and turned to release the expansion of the member 42 within the conduit end with the hollow member 12, secured to the stop valve, preventing the escape of pressurized fluid therefrom. The outer clamping means 79 may then be released from its securement to the tubular member 48 permitting the latter to be moved outwardly so as to retract the closure member 42 from within the conduit end through the open stop valve to within the hollow member 12. The stop valve may then be closed to shut off the flow of pressurized fluid and then the expansible closure means 10 and the safety clamp means may be removed from the stop valve and conduit respectively. The "new" stop valve thus positioned is then ready to have additional conduit or other means attached to its downstream side as the case may be.

It can thus be seen that there has been provided a novel procedure for safely changing stop valves on the downstream end of a pressurized fluid containing conduit. Since the matter of changing a stop valve on a conduit which contains pressurized fluid generally arises only when it is either extremely difficult or even impossible to cut off the flow of pressurized fluid to the stop valve, it is highly important that the changing of the stop valve should be accomplished without permitting the pressurized fluid to freely escape. In such cases, experience has shown that it is usual for considerable fluid to escape and cause severe damage before flow can be stopped. Moreover, with the use of an expansible closure means for changing the stop valve, the occurrence of a blow out of the expansible means, in addition, to permitting the fluid to escape, will itself cause severe damage. In the past, severe injuries have been inflicted by blown out closure assemblies striking an operator.

With the procedure of the present invention, the expansible closure means is not held within the conduit end merely by its pressure-tight frictional engagement therein, but rather is at all times exteriorly secured against movement outwardly of the conduit end. Thus, the procedure of the present invention safely insures against the dangers of "blow out" and the free escape of the pressurized fluid from the conduit end.

It will also be seen that there has been provided an improved expansible closure means having a novel safety feature which tends to prevent any escape of fluid or "blow out" even if utilized by itself. Thus, by the provision of the test valve means, the condition of the pressure-tight engagement of the expansible member within the conduit end may be readily determined even though the latter is hidden from the view of the operator.

Still further, there has been provided by the present invention a novel exterior securing means or safety clamp means which is easy to operate, can be readily adjusted into different positions and which functions to securely maintain an expansible closure means against blow out of the conduit end at all times during the changing of the stop valve.

As a specific example, the invention is particularly applicable in replacing meter stops for gas service in dwellings. In such cases, it is not necessary to close a curb stop in order to shut off the flow of gas to the meter stop and thus shut down service to all the dwellings in the vicinity. On the contrary, with the use of the present invention it is not necessary to go to the trouble of closing curb stops or to disrupt service to other dwellings since replacement may be effected with full pressure in the meter stop conduit. Of greatest significance, is the fact that replacement may be effected with no danger of "blow out" or escape of gas within the dwelling.

It is also to be understood that the form of the invention herewith shown and described is to be taken as the preferred embodiment of the same and that various changes may be made without departing from the spirit of the invention or the scope of the appended claims.

I claim:

1. In apparatus for changing a stop valve or the like on the downstream end of a conduit containing a pressurized fluid, the combination comprising an expansible closure assembly having a tubular member, a draw rod longitudinally movable in said tubular member, said rod having one end portion extending outwardly from one end of said tubular member, means engageable with the opposite end of said draw bar and the opposite end of said tubular member for effecting a longitudinal movement between said draw bar and tubular member in a direction moving said one bar end toward said one tubular member end, and expansible means between said one bar end and said one tubular member end for expansion into closing engagement with the conduit interior upstream of the stop valve in response to actuation of said longitudinal movement effecting means, and exterior securing means for safely maintaining said expansible closure assembly in closing engagement with the conduit during the changing of the stop valve including longitudinally spaced clamping means for engaging said tubular member at longitudinally spaced inner and outer positions thereon disposed outwardly of the conduit end and conduit engaging means for securing said clamping means to the conduit end so as to prevent longitudinally outward movement thereof, said tubular member having outwardly facing abutment means adjacent each end thereof for engagement with the spaced clamping means respectively of said exterior securing means to thereby positively prevent outward longitudinal movement of said tubular member when either of said spaced clamping means is in engagement with the tubular member.

2. The improvement as defined in claim 1 wherein said exterior securing means includes means for adjusting the longitudinal position of said clamping means and means for engaging the upstream end of the stop valve for determining the position of engagement of said conduit engaging means with the conduit.

3. In apparatus for changing a stop valve or the like on the downstream end of a conduit containing a pressurized fluid, the combination comprising an expansible closure assembly having a tubular member, a draw rod longitudinally movable in said tubular member, said rod having one end portion extending outwardly from one end of said tubular member, means engageable with the opposite end of said draw bar and the opposite end of said tubular member for effecting a longitudinal movement between said draw bar and tubular member in a direction moving said one bar end toward said one tubular member end, and expansible means between said one bar end and said one tubular member end for expansion into closing engagement with the conduit interior upstream of the stop valve in response to actuation of said longitudinal movement effecting means, and exterior securing means for safely maintaining said expansible closure assembly in closing engagement with the conduit during the changing of the stop valve, said exterior securing means comprising a single elongated member, conduit engaging means mounted on one end portion of said elongated member for securing the latter to said conduit with its opposite end portion extending longitudinally outwardly of said conduit end, outer clamping means mounted on the outer end portion of said elongated member for engaging the tubular member of said expansible closure assembly outwardly of said conduit end and said stop valve and for securing the same against movement outwardly of said conduit end, and intermediate clamping means mounted on an intermediate portion of said elongated member for engaging the tubular member of said expansible closure assembly intermediate the engagement of said outer clamping means and said conduit end and for maintaining said expansible closure assembly against movement outwardly of said conduit end, each of said clamping means comprising a first element mounted on said elongated member for longitudinal movement with respect thereto, a second element extending transversely outwardly with respect to said elongated member, means mounting the inner end portion of said second element on said first element for sliding movement in the direction of extent of said second element, and a clamp secured to the outer end portion of said second element for engaging the tubular member of said expansible closure assembly.

4. The combination as defined in claim 3 wherein each of said clamping means further includes an exteriorly threaded sleeve rotatably mounted on said elongated member for rotary movement only, said first element having an interiorly threaded opening extending therethrough mounted on said sleeve and movable longitudinally with respect to said sleeve in response to rotation of the latter.

References Cited in the file of this patent

UNITED STATES PATENTS

| | | |
|---|---|---|
| 260,396 | Hunt | July 4, 1882 |
| 607,492 | Thomas et al. | July 19, 1898 |
| 706,531 | Couch et al. | Aug. 12, 1902 |
| 888,146 | Deasy | May 19, 1908 |
| 1,306,858 | Salter | June 17, 1919 |
| 1,687,317 | Archer | Oct. 9, 1928 |
| 1,944,739 | Hunt | Jan. 23, 1934 |
| 2,076,684 | Thomas | Apr. 13, 1937 |
| 2,299,365 | Valuch | Oct. 20, 1942 |
| 2,378,525 | Abegg | June 19, 1945 |
| 2,390,461 | Racy | Dec. 4, 1945 |
| 2,531,942 | Lee | Nov. 28, 1950 |
| 2,594,810 | Schaub | Apr. 29, 1952 |
| 2,690,612 | Scott | Oct. 5, 1954 |
| 2,731,712 | Laux | Jan. 24, 1956 |